M. R. BUIKEMA.
POWER TRANSMITTING DEVICE.
APPLICATION FILED JUNE 18, 1919.
1,364,707.
Patented Jan. 4, 1921.
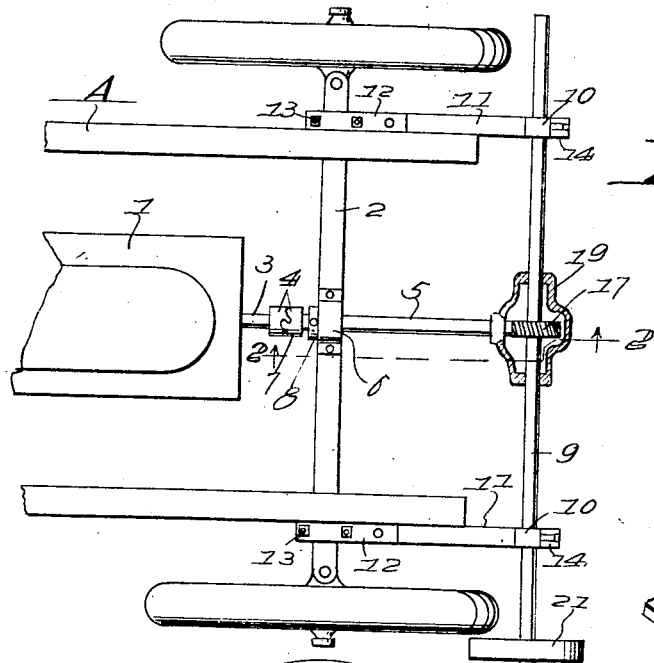
Fig. 1.
Fig. 4.
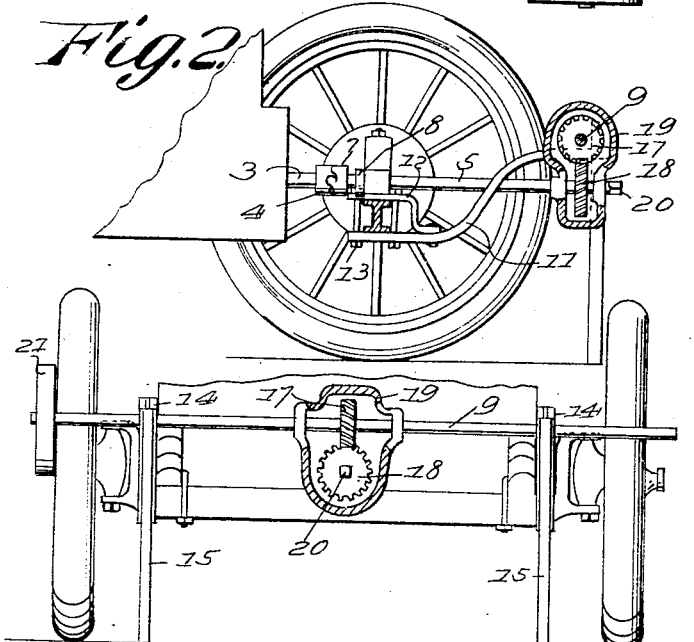
Fig. 2.
Fig. 3.
Inventor
Menno R. Buikema,
By
Attorney

UNITED STATES PATENT OFFICE.

MENNO R. BUIKEMA, OF MORRISON, ILLINOIS.

POWER-TRANSMITTING DEVICE.

1,364,707.  Specification of Letters Patent.  Patented Jan. 4, 1921.

Application filed June 18, 1919. Serial No. 305,175.

*To all whom it may concern:*

Be it known that I, MENNO R. BUIKEMA, a citizen of the United States, residing at Morrison, in the county of Whiteside and State of Illinois, have invented new and useful Improvements in Power-Transmitting Devices, of which the following is a specification.

The invention has particular reference to attachments for auto vehicles, whereby the power of the driving motor of such a vehicle may be utilized for operating mechanical devices other than the vehicle itself.

The principal object of the invention seeks the provision of a mechanism to be applied on the front of a motor vehicle, the motor vehicle being provided with means for attachment to the said mechanism, so that the rotary movement of the motor may be transmitted to the mechanism.

Another object is the provision of a device of this character which is simple in construction, durable and effective in operation, and which may be manufactured at small cost.
Still other and further objects appear in the following detailed description.

To the exact construction to which it is shown and described, the invention is not to be restricted. The right is reserved to make such changes or alterations as may appear desirable from the practical application of the invention provided, of course, that such changes or alterations are comprehended in spirit by the annexed claim.
In the accompanying drawings:

Figure 1 is a top plan view of the invention as applied to an auto vehicle,

Fig. 2 is a section on the line 2—2 of Fig. 1, Fig. 3 is a front elevational view of the structure shown in Fig. 1, Fig. 4 is a perspective view of one of the supporting standards for the driving shaft which comprises a part of the invention.

Referring to the drawings, there is shown the forward end of an auto vehicle mechanism A which is provided with the usual motor 1 and the forward axle 2. The shaft 3 of the motor is equipped with the usual clutch member 4. In place of the usual starting shaft, there is provided a shaft 5 which is journaled adjacent one end in a bearing 6 mounted on the axle 2. This shaft 5 carries at its rear end a clutch member 7 which engages the clutch member 4. The clutch members 4 and 7 are of the usual form employed for starting purposes. Therefore, to prevent their disengagement after the motor 1 has started, a collar 8 is mounted on the shaft 5, this collar abutting the bearing 6 on the rear and taking the thrust imparted to the shaft 5 by the movement of the motor. The collar 8 may be attached to the shaft in any convenient way, preferably by a taper pin inserted transversely through the collar and through the shaft. The shaft 5 is of sufficient length to permit its being geared to a shaft 9 disposed transversely with reference to the vehicle A.

The shaft 9 is journaled near either end in bearings 10 which are made integral parts of arms 11, the latter extending rearwardly and curving downwardly to permit their being secured to the forward axle 2 against the under face thereof, the attachment of the arms being effected through the instrumentality of clamping members 12 whose one end is riveted or otherwise attached to the arm and which are so shaped that they may lie on top of the upper face of the axle, so that bolts 13 may be inserted through the clamping members and through the arms, the bolts being positioned one on either side of the axle.

The arms 11 are extended beyond the bearings 10 a slight distance to permit the slotting of the ends vertically with reference to the normal position of the arms, thereby forming a pair of ears 14 on each arm, the ears standing adjacent the bearings 10, and each pair receiving therebetween a leg or support 15 whose upper ends are loosely carried on pins 16 mounted one in each pair of ears 14. Thus the legs or standards 15 may be used as forward supporting members for the arms 11 when the vehicle A is stationary. When the vehicle is in motion, however, these legs are adapted to be turned over and lie on top of the arms 11 and clamping members 12.

The shaft 9 carries a spiral gear 17 positioned substantially at its longitudinal center, and this spiral gear meshes with a spiral gear 18 mounted on the forward end of the shaft 5. The two gears 17 and 18 are inclosed in a housing 19, which in either side wall is provided with appropriate bearings in which the shaft 9 loosely engages, and which in the forward and rear walls is provided with bearings in which the shaft 5 loosely engages. The housing 19 thus acts to support the forward end of the shaft 5, it being supported itself by the shaft 9. The shaft 5 extends beyond the forward wall of the housing 19 a sufficient distance to permit its square end 20 to receive a crank suitable for imparting initial movement to the motor 1 through the shaft 5.

It will be observed that the rotary movement of the motor 1 is, by means of the mechanism above described, enabled to impart rotary movement to the shaft 9, the movement of the latter being transmitted to devices which it is desired to run by the motor by means of a pulley 21 which is mounted on one end of the shaft 9, but which may be detached, if desired, and mounted on the other end of the shaft 9, since the latter shaft extends an equal length on either side of the vehicle A.

Aside from its use as a power transmitting device, the invention is also serviceable as a bumper for the machine on which it is applied, the transverse shaft 9 serving to insure the vehicle against damage in the event of a collision of any kind.

From the foregoing description taken in connection with the accompanying drawings, the operation and construction of the invention is evident, and further description is, therefore, unnecessary.

The invention having been described, what is claimed as new and useful is:

The combination with an auto vehicle having an engine, of a pair of arms having means for attachment to the front axle of the vehicle, the arms having bearings formed near their forward ends, a transversely disposed shaft journaled in said bearings, a second shaft designed for connection with the crank shaft of the engine of the vehicle, said second shaft extending forwardly so that its forward end passes beyond the transversely disposed shaft, a spiral gear couple connecting the two shafts, a housing for the gear couple, said housing having bearings formed therein for both shafts whereby the forward end of the second shaft is supported by the first said shaft, standards pivotally connected with the arms at their forward ends, whereby the arms may be supported when the vehicle is at rest, and a driving pulley mounted upon the first said shaft.

In testimony whereof I affix my signature.

MENNO R. BUIKEMA.